July 28, 1925.
P. M. MUELLER
THREAD TESTING DEVICE
Filed Nov. 9, 1921
1,547,514
2 Sheets-Sheet 1
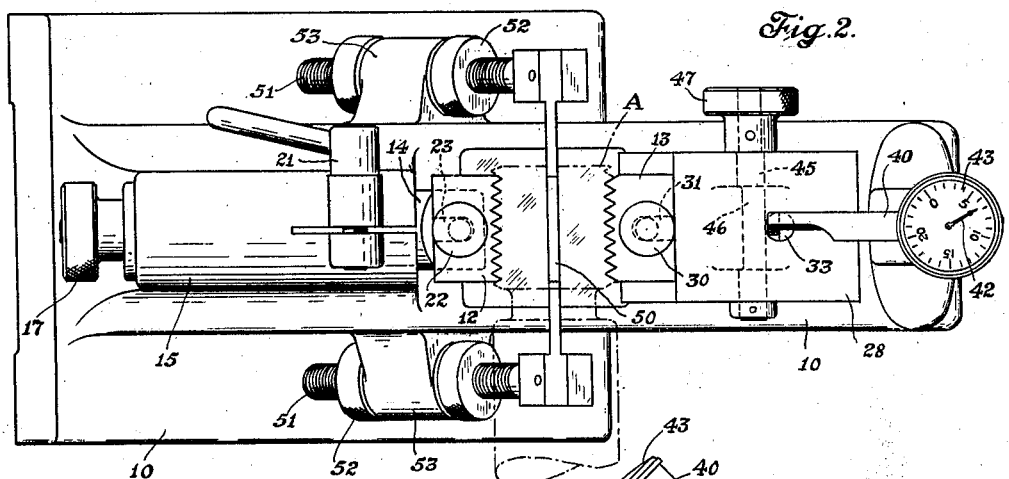
Fig. 2.
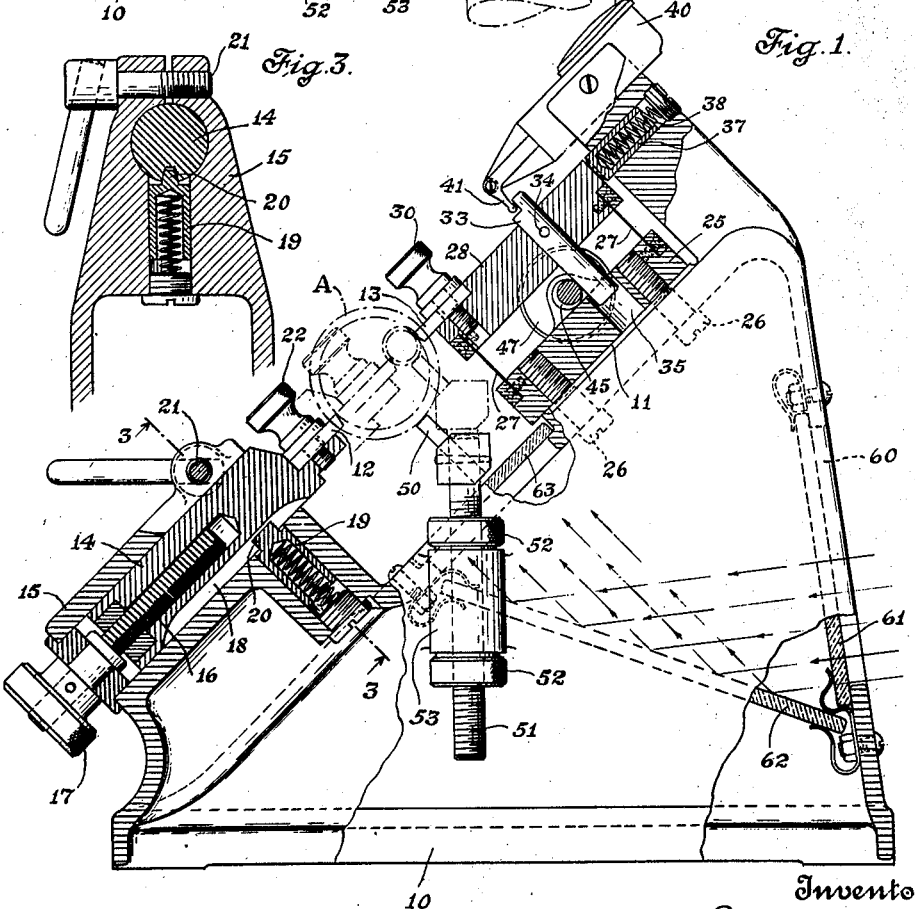
Fig. 3.
Fig. 1.
Inventor
Paul M. Mueller.
By Joseph K. Schofield
Attorney.

July 28, 1925.

P. M. MUELLER

THREAD TESTING DEVICE

Filed Nov. 9, 1921

Inventor
Paul M. Mueller
By Joseph N. Schofield
Attorney

Patented July 28, 1925.

1,547,514

UNITED STATES PATENT OFFICE.

PAUL M. MUELLER, OF HARTFORD, CONNECTICUT, ASSIGNOR TO PRATT & WHITNEY COMPANY, OF NEW YORK, N. Y., A CORPORATION OF NEW JERSEY.

THREAD-TESTING DEVICE.

Application filed November 9, 1921. Serial No. 514,073.

*To all whom it may concern:*

Be it known that I, PAUL M. MUELLER, a citizen of the United States, residing at Hartford, in the county of Hartford and State of Connecticut, have invented certain new and useful Improvements in Thread-Testing Devices, of which the following is a specification.

This invention relates to a thread testing device and in particular to a device for rapidly determining the accuracy of a number of similar screw threaded members.

An object of the present invention is to provide a screw thread testing device which may be adjusted over a wide range of sizes and adapted to quickly compare the accuracies of a number of screw threads with a standard screw thread of the same nominal size. Another object of the invention is to provide a device which by substitution of different forms and sizes of screw thread contacting members and by adjustment of the positions of the screw thread contacting members may be used for comparing the dimensions of a number of different types and sizes of screw threads within a wide range.

One feature which enables me to accomplish the above objects is that I provide a pair of oppositely disposed screw thread gaging or contacting members having serrated edges corresponding in outline to the particular form of screw threads being examined and, by permitting different sets of contacting members to be readily and quickly substituted, any number of different forms of screw threads may be tested. Another feature which is advantageous is that one of the screw thread contacting members is so mounted that it is adjustable over a wide range to accommodate screw threaded members of varying diameters and the oppositely disposed contacting member is flexibly or resiliently mounted so that it may have a limited movement toward or from the first contacting member. Means are also provided whereby the position of the flexibly mounted contacting member may be determined to a high degree of precision when in screw thread engaging position.

Another object of the invention is to provide contacting members adapted to engage but one thread on either side of the specimen being tested so that the inaccuracy in diameter can be determined independently of any error in the lead or pitch of the screw threads. By the use of both forms of gaging or contacting members upon a specimen and a standard, the error, if any, in lead or pitch can be approximately calculated.

It is also an object of the invention to arrange the contacting members and to support the member being tested in such a way that light may be reflected and transmitted through the base of the device so that the contact between the contacting members and the screw threaded body may be visually examined, and errors of pitch and angle of sides of the screw threaded body being tested may be readily ascertained.

A further object of the invention is to provide a suitable adjustable support for the specimen being tested permitting the specimen to be rapidly placed in operative position relative to the contacting or gaging members. It is also an object of the invention to provide a support suitable not only for plain screw threaded members but for such members as taps in which the gaging members must contact at points on the screw threaded portions near the cutting edges.

With these and other objects in view my invention consists in the features of construction and operation set forth in the following specification and illustrated in the accompanying drawing.

In the accompanying drawing annexed hereto and forming a part of this specification, I have shown my invention embodied in a special form of screw thread testing device of small size, but it will be understood that the invention can be otherwise embodied and the details of construction may be varied within wide limits, and the drawing is not to be construed as defining or limiting the scope of the invention, the claims appended to this specification being relied upon for that purpose.

In the drawing:

Figure 1 shows a side elevation of the complete device, parts being shown in section to more clearly show the construction.

Fig. 2 is a view of the complete device looking down upon the upper inclined surface of the device.

Fig. 3 is a sectional view taken on line 3—3 of Fig. 1.

Figure 4:
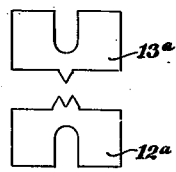
Fig. 4 is a detail view of a particular form of contacting or gaging members adapted for determining errors in diameters of the screw threaded bodies.

In the above mentioned drawing, I have shown but one modification of the invention which is now deemed preferable but it is to be understood that changes and modifications may be made within the scope of the appended claims without departing from the spirit of the invention.

Briefly, my invention in its broadest aspect comprises the following principal parts: first, a base; second, a pair of oppositely disposed screw thread contacting members; third, adjustable means for mounting one of the said screw thread contacting members so that its distance from the opposite contacting member may be readily varied within wide limits; fourth, flexible or resilient means for mounting the opposite screw thread member whereby it may have a limited movement toward or from the adjustable contacting member; fifth, indicating means to determine the variations in the position of the flexibly mounted member when in thread engaging position upon different screw threaded bodies of the same nominal size; sixth, a support for mounting the object to be tested in operative position relative to the contacting members; and seventh, light transmitting and reflecting means in the base of the device whereby the engagement between portions of the contacting members and the screw threaded body may be illuminated and this engagement between the gaging or contacting members and the screw threaded body may be readily observed by the operator.

Referring more in particular to the figures of the drawing, I provide a base 10 having an inclined upper surface 11 on which I mount the supports for the oppositely disposed gaging or contacting members 12 and 13. These contacting or gaging members 12 and 13 comprise short plates preferably hardened and ground and each having one side formed with sections of screw threads corresponding to those in the screw threaded body being tested. It will be understood that these gaging members will have their serrated portions very carefully and accurately surfaced so that they will conform precisely to standard forms of screw threads. These are detachably fastened to their supports or carriers so that other gaging members may be readily substituted when it is desired to examine screw threads having a different pitch or other form of screw thread.

Figure 5:
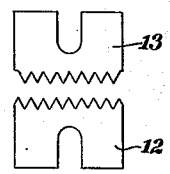
Fig. 5 is a detail view of a form of contacting or gaging members adapted for determining errors of pitch, lead and form of the screw threads.
Figure 6:
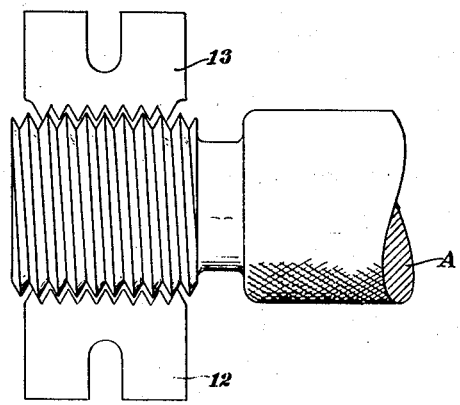
Fig. 6 is a view of a specimen in position relative to the gaging members, the lead of the specimen being incorrect.

The form of contacting or gaging members usually employed is shown in detail in Fig. 5 but, to compare variations in diameter only of screw threaded bodies I employ the modified form of gaging members shown in Fig. 4. This form comprises small plates respectively 12$^a$ and 13$^a$, one of which has one tooth outstanding from the work engaging side and the other two teeth, the space between corresponding in form to the tooth of the first member. In using this form of gaging members 12$^a$ and 13$^a$ the two plates are so located that the serrations are placed in accurately adjusted positions to engage the screw threaded body being examined.

Preferably, I mount one of these gaging members 12 on the forward end of a plunger 14 mounted in a suitable tailblock 15 so that it may be moved axially with the plunger 14. For this purpose I provide a screw 16 extending into the tailblock 15 and engaging the plunger 14 so that rotation of the knurled head 17 on this screw 16 will force the plunger 14 with its screw thread contacting member 12 toward or from the oppositely disposed member 13. This plunger 14 is provided with a longitudinal spline 18 extending through the major portions of its length which is engaged by a small key 19 mounted in the tailblock 15 and having a projection 20 engaging the sides of this spline 18. It will be apparent from the above construction that the plunger carrying the screw thread contacting member 12 may be forced in an axial direction toward or from the opposite contacting member 13 without danger of its being rotated out of its proper position. By this means the contact member 12 is maintained at all times in proper position for engagement with a screw threaded body. A clamping screw 21 is mounted adjacent to a split portion of the tailblock 15 so that the plunger 14 may be clamped in any adjusted position. To hold the contacting member 12 in position on the plunger 14 a clamping screw 22 is provided preferably threaded into the forward end of the plunger 14 as shown. The contacting member 12 is provided with a recess 23 wider than the threaded portion of the clamping screw 22 so that a slight lateral adjustment of the contacting member 12 is permitted.

The support for the flexible or resiliently mounted contacting member 13 comprises a small carriage 25 fixedly secured to the upper inclined surface 11 of the base 10. This carriage 25, as shown clearly in Fig. 1, is securely held to the inclined surface of the base by a pair of screws 26. On this carriage 25 is mounted a pair of resilient metal strips 27 extending perpendicularly from the upper surface of the carriage 25, their upper ends being secured as shown by suitable clamping strips and screws to a movable block 28. At the forward end of this block 28 is a recess in which the contacting member 13 may be fitted and held in position by the clamping screw 30 as shown. The contacting member 13 is provided with a recess 31 similar to recess 23 in contacting member 12 so that a limited lateral adjustment of this member 13 is permitted relative to the block 28. A post or rod 33 is fastened, as by means of the pin 34, to the resiliently mounted block 28 which rod 33 extends through the lower surface of this block 28 and enters a hole 35 provided in the carriage 25. This hole 35 is of greater diameter than the rod 33 so that the block 28 may move back and forth a limited distance governed by the difference in diameter between the hole 35 and the projection of the rod 33. In moving through this limited distance the block 28 is held by the resilient metal strips 27 so that it always assumes parallel positions.

As shown in Fig. 1, the gaging or contacting members 12 and 13 are slightly beveled along their screw threaded surfaces so that their contact with the specimen will be at the intersection of the screw threaded surfaces and the upper flat surface of these members. This permits the contact of the gaging members 12 and 13 with the specimen to be more readily observed.

In order to resiliently force the block 28 always in a direction toward the opposite or adjustably mounted contact member 12 a spring pressed plunger 37 is mounted in the base 10. This, as shown in Fig. 1, is forced by the compression spring 38 contacting with it toward its outermost position.

To determine the position assumed by the resiliently mounted contacting member 13 when in thread engaging position, I mount a dial indicator 40 upon an extension of the base 10 having its operating lever 41 pressing against an upward extending portion of the rod 33 mounted in the block 28. Slight movements or variations in position of this resiliently mounted block 28 will, therefore, be indicated by the position of the pointer 42 of the indicator 40 relative to the indicator dial 43.

I also provide manual means for retracting the block 28 from its forward position which means may conveniently comprise a transverse rod 45 extending across the device which may preferably be journaled in projections formed integrally on both sides of the carriage 25. The mid-section 46 of this rod 45 is formed eccentric to its journal portions and is adapted to engage the rod mounted in the block. Rotation of this rod 45 by its knurled nut 47 will move the block 28 toward or from the opposite or adjustable contact member 12 thus permitting inserting and removal of specimens to be tested.

In order to support the screw threaded body A to be tested in operative position so that it will be engaged by the contacting members 12 and 13 upon diametrically opposite points, a suitable adjustable support is provided. This comprises a transverse bar 50 the upper surface of which lies parallel with the side faces of the contact members, and the position of this surface of the bar 50 may be varied by means of screw threaded rods 51 to which this supporting member 50 is attached at its opposite ends. Knurled nuts 52 on the adjusting rods 51 engage lugs 53 outstanding from the sides of the base 10. Preferably, these knurled nuts 52 are provided on each rod 51 to engage the upper and lower surfaces of these lugs 53 so that the supporting bar 50 may be accurately adjusted and clamped securely in any position. The threaded rods 51 are disposed at an angle of 45° to the plane of the gaging members 12 and 13 so that as they are moved up or down the positioning bar 50 is correctly adjusted for different diameters of specimens by this single direction of motion of the bar.

In order to facilitate the comparison or testing of screw threaded bodies A with a standard specimen, the base 10 is provided with a light transmitting opening 60 so that light rays may be admitted to the under side of the contacting members 12 and 13 and of the screw threaded body A. This light transmitting opening 60 preferably is covered by a ground glass plate 61. A slightly inclined mirror 62 also mounted in the base 10 and a clear glass 63 mounted in the inclined top surface 11 of the base 10 just below the contacting or gaging members may be included so that light rays from the rear, as shown by the dotted arrows may pass through the device and illuminate the lower surface of the contacting or gaging members 12 and 13 and the screw threaded body A being examined.

Figure 7:
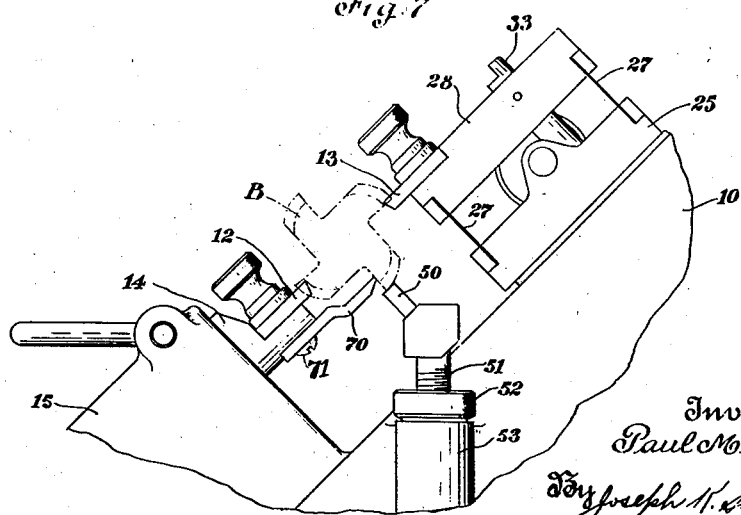
Fig. 7 shows a modified form of supporting member adapted to properly support taps in operative position.

To facilitate the comparison of screw threaded members such as taps I provide, as shown in Fig. 7, a special form of supplementary support. This comprises a finger 70 preferably detachably held to the plunger 14 by a small screw 71. This is positioned so that it will engage the cutting surfaces of a tap B and with the adjustable bar 50 holds the tap B in proper position for engagement with the contacting members 12 and 13. With the aid of this adjustable supporting finger 70, taps may be quickly placed in operative position so that all portions of their threaded surfaces may be readily tested.

Coming now to a brief description of the method of operating the device, contacting or gaging members 12 and 13 are chosen which conform both in pitch and angle of sides with the standard specimen or gage to which the screw threaded bodies being tested must conform to within certain tolerances. These contacting or gaging members 12 and 13 are mounted respectively in the plunger 14 in the tailblock 15 and resiliently mounted block 28. A gage or standard specimen is mounted between these members 12 and 13 and the supporting bar 50 is adjusted in position to hold it in proper position relative thereto. With the gage or standard specimen in place and with the clamping screws 22 and 30 loosened, the contacting or gaging members 12 and 13 may be adjusted in their supports so that they engage perfectly with all the surfaces of the standard specimen. The clamping screws 22 and 30 are then tightened thus holding the contacting members 12 and 13 firmly in properly adjusted position. The knurled head 47 controlling the resiliently mounted contacting member 13 is then turned thus withdrawing the block 28 with the contacting member 13 slightly from the standard specimen and this specimen is then removed. The screw threaded bodies to be tested or compared are then inserted between the contacting or gaging members 12 and 13 and the knurled head 47 rotated in the opposite direction, thus permitting the block 28 to move downward until the threaded or serrated surface of the resiliently mounted contacting member 13 engages this screw threaded body A. The position of the dial indicator pointer 42 is then noted, and if the screw threaded body is of the same size as the standard specimen and of correct pitch and conformation of the threads, the pointer of the dial indicator 42 will stand over the same graduation on the dial 43 as when the standard specimen was in operative position. Should the position of the resiliently mounted contacting or gaging member 13 not correspond to that when the standard specimen was in operative position, the position of the pointer 42 on the dial indicator 40 will be different and the operator may readily sight along the contacting surfaces of the screw threaded body A and the gaging members 12 and 13 thus being enabled to at once locate the points at which the screw threaded body is inaccurate and the character of the inaccuracies.

It is obvious from the above that with the contacting or gaging members 12 and 13 once adjusted for a particular size and form of screw threaded body that a plurality of similar sizes and types of screw threaded bodies may be quickly and accurately compared with the standard specimen. This is accomplished by simply withdrawing the resiliently mounted block 28, inserting the specimen in operative position and permitting the resiliently mounted gaging member 13 to move downward again under the influence of the spring pressed plunger 37. The amount of error in the specimen is indicated by observing the position of the dial indicator pointer 42 and the character of the inaccuracy is indicated by observation of the contact between the serrated edges of the gaging members 12 and 13 and the screw threaded surface of the specimen A being examined. The contact between these surfaces is readily observed by reason of their being illuminated by the light rays transmitted and reflected through the base 10.

By first using the gaging members 12ª and 13ª and then the members 12 and 13 it is possible to estimate the error in pitch or lead of the specimen being tested. By use of the gaging members 12ª and 13ª differences in diameters between a standard and a specimen being tested is at once apparent by observation of the positions of the dial indicator. If, with the error in diameter of a specimen known the gaging members 12 and 13 are used, then, by observing the error as indicated by the dial indicator, the error in lead may be calculated. This error in lead as indicated by the dial indicator is proportional to the length of the plates of the gaging members, and varies with the angle of the sides of the thread. By knowing the angle of the sides of the threads, the length of the gaging members, and deducting the error in diameter, if any, of the specimen, the error in lead may be readily calculated.

What I claim is:

1. A screw thread testing device comprising in combination, a base, a pair of screw thread gaging members mounted in an oblique plane thereon, means to adjust one of said gaging members for different sizes of screw threads, means permitting a slight movement of the other gaging member while it is maintained parallel to said first mentioned gaging member, and indicating means to determine the position of said latter gaging member when in thread engaging position.

2. A screw thread testing device comprising in combination, a base, a pair of screw thread gaging members mounted thereon, means to adjust one of said gaging members for different sizes of screw threads, flexible bands permitting a slight movement of the other gaging member directly toward or from said first member while it is maintained parallel to said first mentioned gaging member, indicating means to determine the position of said latter gaging member when in thread engaging postion, and adjustable supporting means for the specimen being tested.

3. A screw thread testing device comprising in combination, a base, a pair of screw thread gaging members mounted in an oblique plane thereon, means to adjust the position of one of said members for different sizes of screw threads, means permitting a slight movement of one of said gaging members, the positions of said latter gaging members being always parallel to the other, and indicating means mounted in fixed position to determine the position of said latter gaging member when in thread engaging positions.

4. A screw thread testing device comprising in combination, a base, a pair of screw thread gaging members having portions of screw thread form adapted to engage a specimen being tested upon diametrically opposite sides, said gaging members being beveled so that contact with said specimen will be at a flat surface of said gaging members, and indicating means to determine the relative positions of said gaging members when in operative position.

5. A screw thread testing device comprising in combination, a base, a pair of screw thread gaging members mounted thereon, a support for the screw threaded member being tested, and light transmitting and reflecting means through the base whereby the contact between the screw threaded member and the gaging members may be observed.

6. A screw thread testing device comprising in combination, a base, a pair of screw thread gaging members mounted thereon, a support for the screw threaded member being tested, and light transmitting and reflecting means through the base comprising a ground glass and mirror whereby the contact between the screw threaded member and gaging members may be observed.

7. A screw thread testing device comprising in combination, a base, a pair of oppositely disposed screw thread gaging members mounted thereon, an adjustable support for the screw threaded member being tested, and light transmitting and reflecting means through the base whereby light is directed to said gaging members and the contact between the screw threaded member and gaging members may be observed.

In testimony whereof, I hereto affix my signature.

PAUL M. MUELLER.